United States Patent [19]

Beeskow et al.

[11] 3,931,876

[45] Jan. 13, 1976

[54] CLUTCH DISK FOR MOTOR VEHICLE MAIN CLUTCHES

[75] Inventors: Bruno Beeskow, Bietigheim; Günter Wörner, Rommelshausen; Peter Schrape, Stuttgart, all of Germany

[73] Assignee: Daimler-Benz Aktiengesellschaft, Germany

[22] Filed: Nov. 11, 1974

[21] Appl. No.: 522,980

[30] Foreign Application Priority Data

Nov. 13, 1973 Germany............................ 2356559

[52] U.S. Cl. ....... 192/106.2; 192/106.1; 192/70.18; 64/27 F
[51] Int. Cl.² .......................................... F16D 3/14
[58] Field of Search........... 192/106.2, 106.1, 70.18, 192/70.19; 64/27 F, 27 C

[56] References Cited
UNITED STATES PATENTS

| | | | |
|---|---|---|---|
| 3,138,039 | 6/1964 | Zeidler et al. .................. | 192/106.2 |
| 3,578,121 | 5/1971 | Maurice ...................... | 64/27 F X |
| 3,762,521 | 10/1973 | Dotter.......................... | 192/106.2 |
| 3,817,362 | 6/1974 | Rist................................ | 192/106.1 |
| 3,863,747 | 2/1975 | Werner........................... | 192/106.2 |

Primary Examiner—Samuel Scott
Assistant Examiner—Randall Heald
Attorney, Agent, or Firm—Craig & Antonelli

[57] ABSTRACT

A clutch disk for motor vehicle main clutches which includes a disk member carrying the friction linings and torsionally elastically arranged with respect to a hub member whereby for purposes of achieving a multi-stage torsional elasticity, several springs or spring sets with different characteristics are provided in windows of a hub flange or of the disk member and of a lateral member rigidly connected therewith which cooperate with correspondingly larger windows in the other of these two parts; friction damping means are thereby coordinated to these springs whose start of operation are determined by control means which engage into the corresponding windows or cooperate with the spring ends; only the friction of the friction device which has been engaged last, is thereby effective in the operating range whereby two friction devices are provided, of which the first friction device is operatively connected by means of its control spring with the hub flange while the second friction device is operatively connected by means of its control spring with the lateral members; the two control members are thereby connected with each other by a drag-type connection which becomes effective only after the angular path provided for the idling range has been traversed.

20 Claims, 3 Drawing Figures

ANGLE OF ROTATION

CLUTCH DISK FOR MOTOR VEHICLE MAIN CLUTCHES

The present invention relates to a clutch disk for motor vehicle main clutches with a disk member carrying the friction linings and torsionally elastically arranged with respect to a hub member, whereby for a multi-stage torsional elasticity within the operating range, several springs or spring sets with different characteristics are arranged in windows of a hub flange or of the disk member and of a lateral sheet metal member rigidly connected therewith, which cooperate with corresponding larger windows in the respective other part (lateral sheet metal member or hub flange), whereby friction-damping means are coordinated to these springs, whose start of operation is determined by control means which engage with tabs, lugs, arms or the like in the corresponding windows or cooperate with the spring ends.

Clutch disks of the aforementioned type are described already in the Patent No. 62,694 of the Democratic Republic of Germany. However, the friction devices thereby act additively, i.e., only an increase of the damping was possible. Nonetheless, the desire always exists for an adaptation or coordination of the respectively required damping to the existing operating conditions which is as accurate as possible. The present invention is therefore concerned with the task to fulfill this desire with means which are as simple as possible from a constructive point of view.

According to the present invention, the underlying problems are solved with the clutch disks of the aforementioned type in that for a multi-stage damping within the operating range, in which only the friction of the friction device engaged last is effective, two friction devices—each consisting of friction means, sheet metal control member and control spring— are provided whose first friction device is coupled with the hub flange by means of its control spring arranged in a window of the hub flange and by means of the coordinated friction disk having a sheet metal control member and whose second friction device is coupled with the lateral sheet metal members by means of its control spring arranged in a window of the lateral sheet metal member and by means of the coordinated friction disk having a sheet metal control member, and in that the first sheet metal control member is coupled with the second sheet metal control member by a drag connection which becomes effective after passing through the angular path provided for the idling range.

A very accurate adaptation of the friction, i.e., of the desired damping to the respective operating condition can be achieved by the present invention. Above all it is possible to undertake such an adaptation also if the damping is to become smaller with an increasing angle of rotation or twist and not larger as frequently customary. The arrangement may thereby be made according to the present invention in such a manner that the starting points of operation of the friction devices coincide with those of the stage springs. However, it is also within the scope of the present invention if the starting points of operation of the friction devices differ from those of the stage springs. One achieves thereby an advantageous further subdivision, i.e., the characteristics now achieved can follow even more closely the desired ideal curve. It is possible in both cases to provide a so-called advanced damping.

For the last-mentioned case with at least three spring stages of continuously or increasingly harder characteristics, with one friction device for the idling range and with two separate main friction devices for the operating range, it is proposed by the present invention that the construction and arrangement of the stage springs is so provided that the effect of the first main friction device commences with the second spring stage and the effect of the second main friction device starts still within the range of the second spring stage and from that point on, the damping of the second main friction device replaces that of the first main friction device. As a result of this construction, a good adaptation to the ideal curve results and additionally the possibility exists, as already mentioned, to impart to the second main friction device a smaller damping than that of the first friction device.

It is additionally proposed by the present invention that the first sheet metal control member of the first main friction device encloses by means of a window the first control spring arranged in a similarly large window of the hub flange and that the first sheet metal control member includes approximately oppositely disposed a fork arm whose two prongs enclose a balcony-like embossment or pressed-out portion at the second sheet metal control member. A spacing then exists between these prongs and the balcony-like embossment or pressed-out portion whose size corresponds to the angle of rotation or twist of the idling range.

As already proposed previously, the first main friction device is arranged on one side of the hub flange and the second main friction device on the other side thereof. According to the present invention, the first sheet metal control member may thereby be rigidly connected with the area of its window by means of volts with a similarly shaped counter sheet metal member on the other side of the hub flange and corresponding apertures—starting from the window of the first control spring—may be provided for these bolts in the hub flange.

Accordingly, it is an object of the present invention to provide a clutch disk for motor vehicle main clutches which avoids by simple means the aforementioned shortcomings and drawbacks encountered in the prior art.

Another object of the present invention resides in a clutch disk for motor vehicle main clutches which permits an adaptation of the required damping to the existing operating conditions that it is as accurate as possible.

A further object of the present invention resides in a clutch disk for motor vehicle main clutches in which a decrease of the damping is also possible with an increase in the angle of rotation.

Still a further object of the present invention resides in a clutch disk for motor vehicle main clutches which not only permits a coordination of the requisite damping to the existing operating conditions that is as accurate as possible, yet involves relatively simple constructive means to achieve these goals.

Another object of the present invention resides in a clutch disk for motor vehicle main clutches in which such adaptation is possible also when the damping is to become smaller with an increasing angle of rotation.

A further object of the present invention resides in a clutch disk for motor vehicle main clutches which is relatively simple in construction, yet enables the attainment of operating characteristics that are greatly improved as compared to those attainable heretofore.

These and further objects, features and advantages of the present invention will become more apparent from the following description when taken in connection with the accompanying drawing which shows, for purposes of illustration only, one embodiment in accordance with the present invention, and wherein.

Figure 1:
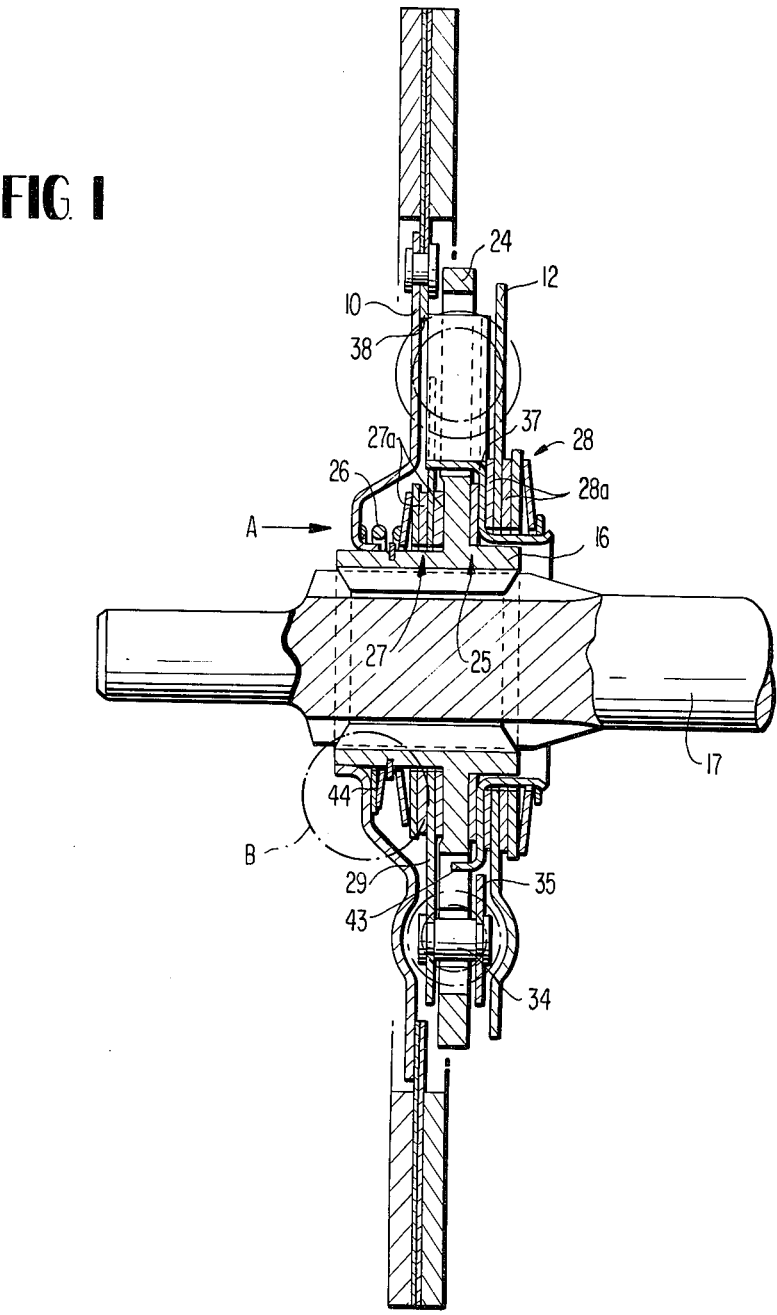
FIG. 1 is a cross-sectional view through a clutch disk in accordance with the present invention, whereby the circle B, indicated in dash and dot lines, indicates a modified construction also usable with the present invention.
Figure 2:
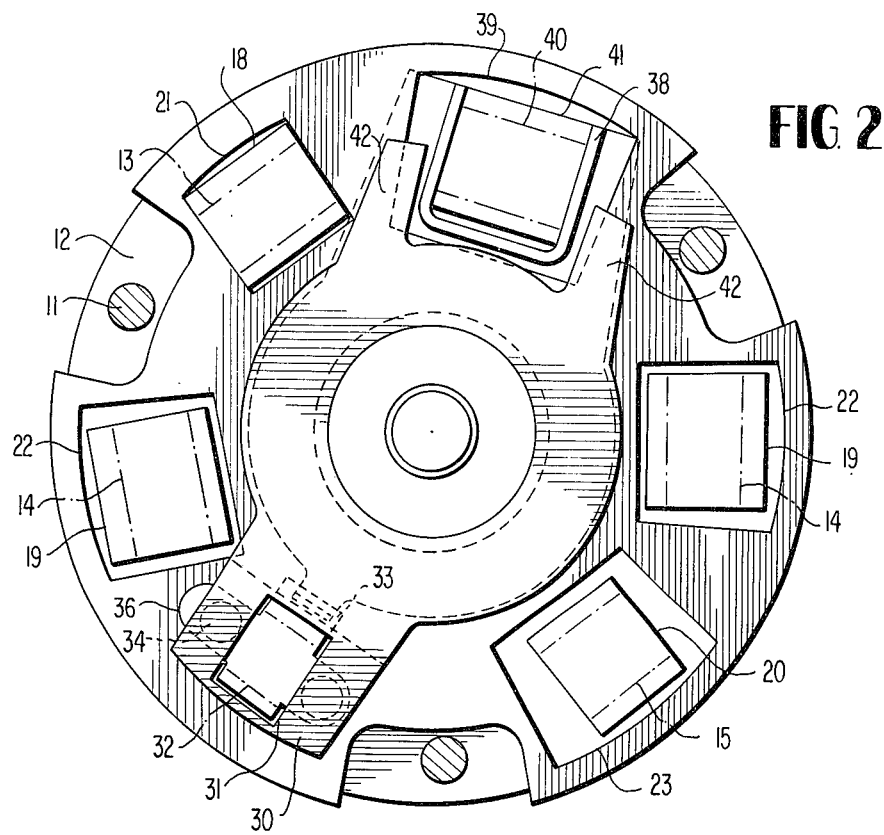
FIG. 2 is an elevational view of the control disks and of the spring arrangement of the clutch disk according to FIG. 1, as viewed in the direction of the arrow A according to FIG. 1, with the disk member removed.

Referring now to the drawing wherein like reference numerals are used throughout the various views to designate like parts, and more particularly to FIGS. 1 and 2, according to these figures, the disk member 10 carrying the friction linings if rigidly connected in a conventional manner with a lateral sheet metal member 12 by means of bolts 11. This entire system is connected by way of several stage springs 13 to 15 with a hub member 16 which, in its turn, is seated on the output shaft 17 to rotate in unison therewith. The stage spring 13 is effective in the idling range. The two stage springs 14 form together the second spring stage whereas the stage springs 15 are provided for the third spring stage. All stage springs are accommodated in correspondingly dimensioned windows 18 to 20 of the system consisting of the lateral member 12 and of the disk member 10. Corresponding windows 21 to 23 in the hub flange 16 are coordinated respectively to these windows 18 to 20. In connection with the idling spring 13 (first spring stage), the two windows 18 and 21 are of identical size whereas in connection with the other stage springs, the windows 22 and 23 in the hub flange are respectively increasingly larger than the corresponding windows 19 and 21 in which the stage springs are supported. The respective starting point of operation of the corresponding spring stages is determined by this distance of the lateral edges.

A friction device generally designated by reference numeral 25 having a coil spring 26 serves for the damping of the idling vibrations. Two main friction devices are provided for the operating range. The first main friction device generally designated by reference numeral 27 having the two friction disks 27a is disposed on one side of the hub flange 24 whereas the second main friction device generally designated by reference numeral 28 having the two friction disks 28a is located on the other side of the hub flange 24. The sheet metal control member 29 of the first main friction device 27 has a radially extending arm 30 provided with a window 31 (FIG. 2). This window 31 encloses the first control spring 32 which is accommodated under prestress in a similarly large window 33 of the hub flange 24. However, this last-mentioned window 33 radially protrudes further inwardly than the window 31. Within the area of the arm 30, the sheet metal control member 29 is rigidly connected by means of bolts 34 with a counter disk 35 on the other side of the hub flange 24. The bolts 34 extend through enlargements 36 (FIG. 2) of the window 33 in the hub flange 24.

The sheet metal control member 37 of the second main friction device 28 engages with a balcony-like embossment or pressed-out portion 38 through a larger window 39 provided in the hub flange 24. It encloses with this balcony-like embossment or pressed-out portion 38, the second control spring 40 which is accommodated under a corresponding pre-stress in a similarly large window 41 of the disk member 10 and of the lateral member 12. The balcony-like embossment or pressed-out portion 38 in its turn, is enclosed on the other side of the hub flange 24 by the two prongs 42 of a fork arm at the first sheet metal control member 29 with a certain spacing. This spacing corresponds to the angle of rotation or twist for the idling range. Approximately opposite to the balcony-like embossment or pressed-out portion 38 an axial angularly bent portion 43 is provided at the second sheet metal control member 37 which engages into the window 33 provided in the hub flange 24. The lateral distance of this angularly bent portion 43 from the lateral edges of the window 33 corresponds to the distance of the balcony-like embossment or pressed-out portion 38 from the lateral edges of the window 39.

According to FIG. 1, the disk member 10 is centered directly on the hub member 16 as shown in the construction above the center line. On the other hand, another type of this centering and of this spring is illustrated in the part of FIG. 1 surrounded by the dash and dot circle B. The disk member 10 is now angularly bent off toward the outside and a cup spring 4 is now provided for the actuation of the idling friction device 25 in lieu of the coil spring 26. Of course, in an actual construction, only one or the other arrangement is used which then extends over the entire circumference of the clutch disk.

The operation of this clutch disk will be explained by reference to FIG. 3. Within the range L, at first only the first stage spring 13 together with the idling friction device 25 is effective. The idling vibrations are damped correspondingly. This damping, however, is so slight that it was not shown in the diagram in FIG. 3. Within this range, the system consisting of the disk member 10 and of the lateral member 12 rotates together with the second main friction device 28 coupled thereto with respect to the hub flange 24 and the first main friction device 27 coupled thereto. Both main friction devices are therefore inoperable or ineffectual. After using up this angle of rotation or angle of twist, i.e., therefore in point C according to FIG. 3, the second spring stage, i.e., the two stage springs 14 become effective. Additionally, the balcony-like embossment or pressed-out portion 38 of the second control disk 37 abuts at one fork prong 42 of the first sheet metal control member 29. Since the second control spring 404 is prestressed more strongly than the first control spring 32, upon further movement of the second control member 37, the first control member 29 is now taken along. It now rotates against the resistance of the first control spring 32 with respect to the friction disks 27a of the first main friction device 27 so that the same becomes effective. Within the range M according to FIG. 3, therefore the second spring stage together with the first main friction device 27 and the control spring 32 thereof are therefore operable.

Figure 3:
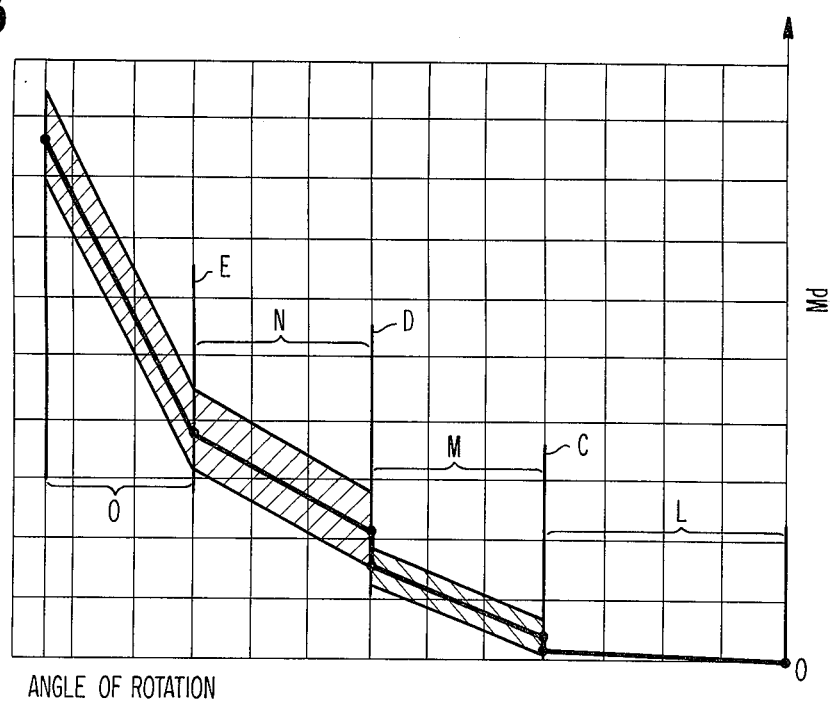
FIG. 3 is a diagram of the clutch disk according to FIGS. 1 and 2, indicating torque against angle of rotation.

This lasts for such length of time until in point D according to FIG. 3, the balcony-like embossment or pressed-out portion 38 abuts at the lateral edge of the window 39 provided in the hub flange 24. From now on, both control members 37 and 39 remain stationary in relation to the hub flange 24 and only the system formed by the disk member 10 and the lateral member 12 now moves against the second spring 40 with respect to the second sheet metal control member 37 and all parts which have remained stationary, especially with respect to the friction disks 28a. As a result thereof, the second main friction device 28 now becomes effective, whereas the first main friction device 27 is being disengaged as inoperable or ineffective. Within the range N according to FIG. 3, the second spring stage (control springs 13 and 14) therefore cooperates with the damping of the second main friction device 28 and the control spring 40 thereof. This operation lasts for such length of time until in point E according to FIG. 3, the third stage spring 15 becomes additionally effective. Within the range O, the third spring stage (stage springs 13–15) now cooperates with the second main friction disk device 28 and the control spring 40 thereof.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A clutch disk for motor vehicle main clutches which comprises a disk means carrying friction linings and torsionally elastically arranged with respect to a hub means, several spring means with different characteristics being provided in window means of one of the two parts consisting of a hub flange forming part of the hub means, on the one hand, and of the disk means and a lateral member rigidly connected therewith, on the other, which cooperate with corresponding larger window means provided in the respective other of said two parts, a friction damping means coordinated to said spring means whose start of operation is determined by control means, characterized in that for a multi-stage damping within the operating range in which only the friction of the friction damping means is effective which has been engaged last, two friction damping means are provided each including friction disk means, the first friction damping means being operatively connected with the hub flange by means of its control spring means arranged in a window means of the hub flange and by means of the coordinated friction disk means provided with its control means, and the second friction damping means being coupled to the lateral members by means of its control spring means arranged in a window means of the lateral members and by means of the coordinated friction disk means provided with its control means.

2. A clutch disk according to claim 1, characterized in that the first control member is operatively connected with the second control member by a drag connecting means which becomes effective after the angular path provided for the idling range.

3. A clutch disk according to claim 2, characterized in that the control means engage in corresponding window means with projections.

4. A clutch disk according to claim 3, characterized in that said projections are in the form of tabs.

5. A clutch disk according to claim 3, characterized in that the projections are in the forms of arms.

6. A clutch disk according to claim 2, characterized in that the control means cooperate with the spring ends.

7. A clutch disk according to claim 2, characterized in that the friction damping means include each friction means, a control member and a control spring means.

8. A clutch disk according to claim 7, characterized in that the spring means include several springs.

9. A clutch disk according to claim 7, characterized in that the spring means include several spring sets.

10. A clutch disk according to claim 7, with at least three spring stages of continuously harder characteristics, one friction damping means for the idling range and two separate main friction damping means for the operating range, characterized by stage spring means which are operable in such a manner that the effect of the first main friction damping means commences with the second spring stage and the effect of the second main friction damping means commences still within the range of the second spring stage and from that point on the damping of the second main friction damping means replaces that of the first main friction damping means.

11. A clutch disk according to claim 10, characterized in that the first control member of the first main friction damping means encloses with a window means the first control spring means arranged in a similarly large window means of the hub flange, and in that the first control member includes an approximately oppoistely disposed fork arm whose two prongs enclose a balcony-like pressed-out portion provided at the second control member.

12. A clutch disk according to claim 11, characterized in that the first control member is rigidly connected within the area of its window means with a counter member on the other side of the hub flange.

13. A clutch disk according to claim 12, characterized in that the first control member is connected with the counter member by means of bolts, and in that corresponding aperture means are provided for the bolts in the hub flange.

14. A clutch disk according to claim 13, characterized in that the aperture means start from the window means of the first control spring.

15. A clutch disk according to claim 1, with at least three spring stages of continuously harder characteristics one friction damping means for the idling range and two separate main friction damping means for the operating range, characterized by stage spring means which are operable in such a manner that the effect of the first main friction damping means commences with the second spring stage and the effect of the second main friction damping means commences still within the range of the second spring stage and from that point on the damping of the second main friction damping means replaces that of the first main friction damping means.

16. A clutch disk according to claim 15, characterized in that the first control member of the first main friction damping means encloses with a window means the first control spring means arranged in a similarly large window means of the hub flange, and in that the first control member includes an approximately oppositely disposed fork arm whose two prongs enclose a balcony-like pressed-out portion provided at the second control member.

17. A clutch disk according to claim 16, characterized in that the first control member is rigidly connected within the area of its window means with a counter member on the other side of the hub flange.

18. A clutch disk according to claim 17, characterized in that the first control members connected with the counter member by means of bolts, and in that corresponding aperture means are provided for the bolts in the hub flange.

19. A clutch disk according to claim 18, characterized in that the aperture means start from the window means of the first control spring.

20. A clutch disk according to claim 1, characterized in that the friction damping means include each friction means, a control member and a control spring means.

* * * * *